US012699541B2

(12) United States Patent
Lester et al.

(10) Patent No.:  US 12,699,541 B2
(45) Date of Patent:      Aug. 4, 2026

(54) PREDICTED AUDIO IMMERSION RELATED TO AUDIO CAPTURE DEVICES WITHIN AN AUDIO ENVIRONMENT

(71) Applicant: Shure Acquisition Holdings, Inc., Niles, IL (US)

(72) Inventors: Michael Lester, Buena Vista, CO (US); Iris Lorente, Park Ridge, IL (US)

(73) Assignee: SHURE ACQUISITION HOLDINGS, INC., Niles, IL (US)

( * ) Notice: Subject to any disclaimer, the term of this patent is extended or adjusted under 35 U.S.C. 154(b) by 206 days.

(21) Appl. No.: 18/583,230

(22) Filed: Feb. 21, 2024

(65) Prior Publication Data

US 2024/0289089 A1      Aug. 29, 2024

Related U.S. Application Data

(60) Provisional application No. 63/486,545, filed on Feb. 23, 2023.

(51) Int. Cl.
| | |
|---|---|
| *G06F 3/16* | (2006.01) |
| *H04R 5/027* | (2006.01) |
| *H04S 7/00* | (2006.01) |

(52) U.S. Cl.
CPC ............. *G06F 3/165* (2013.01); *H04R 5/027* (2013.01); *H04S 7/302* (2013.01); *H04S 2400/11* (2013.01); *H04S 2400/15* (2013.01)

(58) Field of Classification Search
CPC ......... G06F 3/165; H04R 5/027; H04R 3/005;
H04S 7/302; H04S 2400/11; H04S
2400/15; G06N 3/045; G06N 3/08; G10L
15/18; G10L 25/30; G10L 15/16
See application file for complete search history.

(56) References Cited

U.S. PATENT DOCUMENTS

| | | | | |
|---|---|---|---|---|
| 10,474,419 B2 * | 11/2019 | Fink | ........................ | G06F 3/162 |
| 10,812,902 B1 * | 10/2020 | Abel | ........................ | H04R 3/02 |
| 10,930,298 B2 * | 2/2021 | Kaskari | ............... | G10L 21/0264 |

(Continued)

FOREIGN PATENT DOCUMENTS

| | | |
|---|---|---|
| CN | 109273021 A | 1/2019 |
| CN | 109767760 A | 5/2019 |

(Continued)

*Primary Examiner* — Akelaw Teshale
(74) *Attorney, Agent, or Firm* — Alston & Bird LLP

(57) ABSTRACT

Techniques for predicted audio immersion related to audio capture devices within an audio environment are discussed herein. Examples may include receiving audio stream inputs associated with audio capture devices positioned within one or more audio capture areas of an audio environment, where the audio environment comprises the one or more audio capture areas and one or more non-audio capture areas. Additionally, the audio stream inputs are transformed into respective audio feature sets. The respective audio feature sets are then input to a hybrid neural network model configured to generate respective augmented signal path data vectors for the respective audio stream inputs. Respective neural network paths of the hybrid neural network model may process one or more of the respective audio feature sets based on respective digital signal processing augmentation networks integrated within the hybrid neural network model.

20 Claims, 8 Drawing Sheets

(56)  References Cited

U.S. PATENT DOCUMENTS

| 11,240,621 B2 * | 2/2022 | Li ........................... H04S 7/302 |
| 12,361,942 B1 * | 7/2025 | Joshi ................... G10L 21/0208 |
| 2004/0013252 A1 | 1/2004 | Craner |
| 2005/0216258 A1 | 9/2005 | Kobayashi et al. |
| 2007/0021958 A1 | 1/2007 | Visser et al. |
| 2017/0325023 A1 | 11/2017 | Nongpiur |
| 2018/0122403 A1 * | 5/2018 | Koretzky .............. G10L 21/028 |
| 2018/0182411 A1 * | 6/2018 | Kaskari ................. G10L 19/008 |
| 2019/0122689 A1 | 4/2019 | Jain et al. |
| 2019/0139563 A1 * | 5/2019 | Chen ...................... G06N 3/084 |
| 2019/0206417 A1 * | 7/2019 | Woodruff .............. G10L 21/028 |
| 2019/0318757 A1 * | 10/2019 | Chen ................... G10L 21/0272 |
| 2020/0066296 A1 | 2/2020 | Sargsyan et al. |
| 2020/0245065 A1 | 7/2020 | Yorga et al. |
| 2020/0312343 A1 | 10/2020 | Hsiung |
| 2021/0004201 A1 * | 1/2021 | Munoz ................... H04S 7/304 |
| 2021/0120335 A1 | 4/2021 | Veselinovic et al. |
| 2021/0321212 A1 * | 10/2021 | Li ........................... H04S 7/304 |
| 2022/0086592 A1 | 3/2022 | McElveen et al. |
| 2022/0114995 A1 | 4/2022 | Kuthuru et al. |
| 2022/0201421 A1 * | 6/2022 | McElveen .............. H04R 1/406 |
| 2022/0369031 A1 * | 11/2022 | Lester ................... G10L 21/028 |
| 2023/0352058 A1 * | 11/2023 | Steinmetz ................ G10H 1/46 |
| 2024/0357309 A1 * | 10/2024 | Gollakota ............. G10L 21/028 |

FOREIGN PATENT DOCUMENTS

| CN | 110491407 A | 11/2019 |
| CN | 113571074 A | 10/2021 |
| CN | 113823309 A | 12/2021 |
| EP | 4002361 A1 | 5/2022 |
| WO | WO 2022/026948 A1 | 2/2022 |
| WO | WO 2022/162878 A1 | 8/2022 |

* cited by examiner

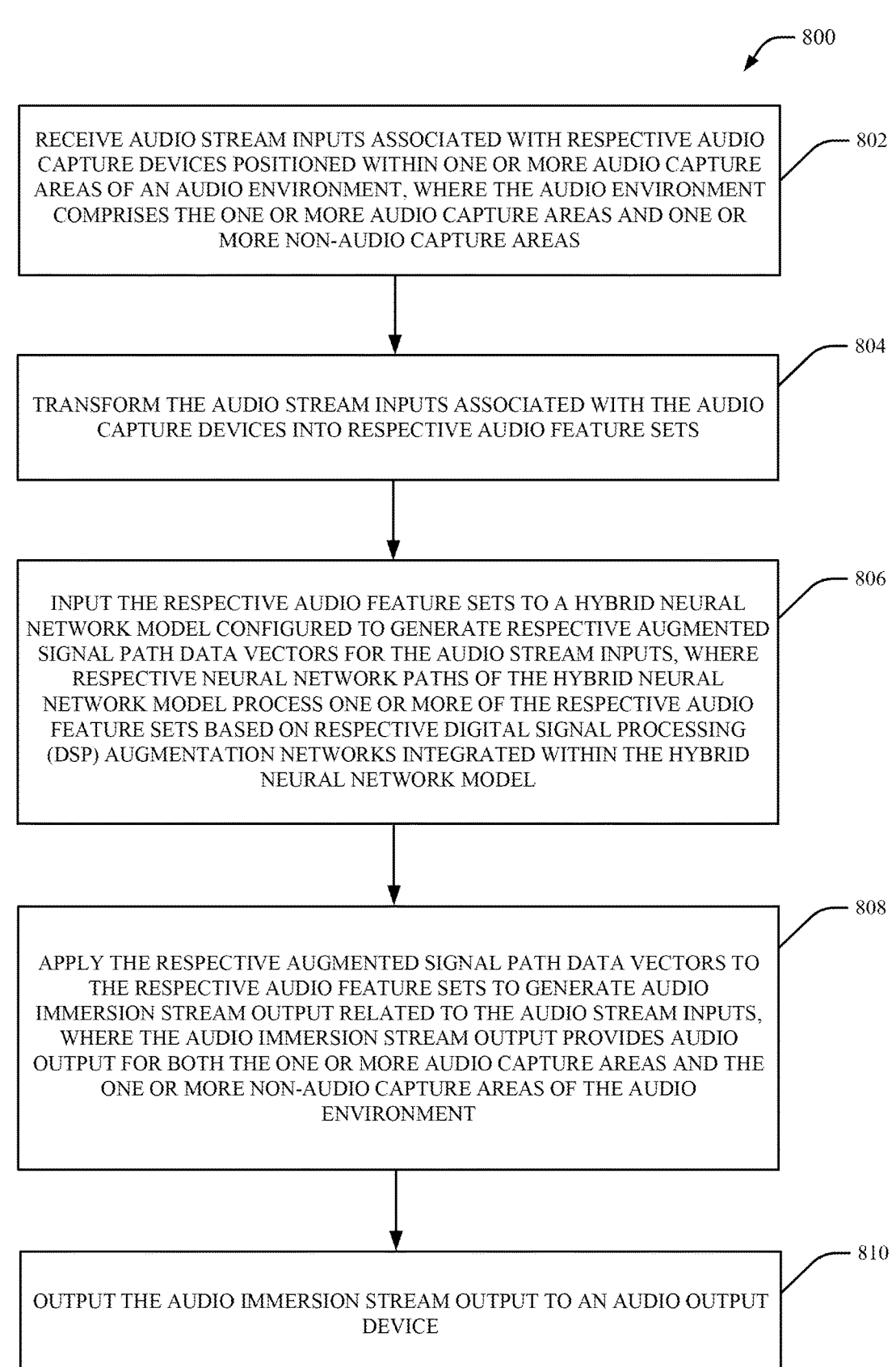

— 800

RECEIVE AUDIO STREAM INPUTS ASSOCIATED WITH RESPECTIVE AUDIO CAPTURE DEVICES POSITIONED WITHIN ONE OR MORE AUDIO CAPTURE AREAS OF AN AUDIO ENVIRONMENT, WHERE THE AUDIO ENVIRONMENT COMPRISES THE ONE OR MORE AUDIO CAPTURE AREAS AND ONE OR MORE NON-AUDIO CAPTURE AREAS — 802

TRANSFORM THE AUDIO STREAM INPUTS ASSOCIATED WITH THE AUDIO CAPTURE DEVICES INTO RESPECTIVE AUDIO FEATURE SETS — 804

INPUT THE RESPECTIVE AUDIO FEATURE SETS TO A HYBRID NEURAL NETWORK MODEL CONFIGURED TO GENERATE RESPECTIVE AUGMENTED SIGNAL PATH DATA VECTORS FOR THE AUDIO STREAM INPUTS, WHERE RESPECTIVE NEURAL NETWORK PATHS OF THE HYBRID NEURAL NETWORK MODEL PROCESS ONE OR MORE OF THE RESPECTIVE AUDIO FEATURE SETS BASED ON RESPECTIVE DIGITAL SIGNAL PROCESSING (DSP) AUGMENTATION NETWORKS INTEGRATED WITHIN THE HYBRID NEURAL NETWORK MODEL — 806

APPLY THE RESPECTIVE AUGMENTED SIGNAL PATH DATA VECTORS TO THE RESPECTIVE AUDIO FEATURE SETS TO GENERATE AUDIO IMMERSION STREAM OUTPUT RELATED TO THE AUDIO STREAM INPUTS, WHERE THE AUDIO IMMERSION STREAM OUTPUT PROVIDES AUDIO OUTPUT FOR BOTH THE ONE OR MORE AUDIO CAPTURE AREAS AND THE ONE OR MORE NON-AUDIO CAPTURE AREAS OF THE AUDIO ENVIRONMENT — 808

OUTPUT THE AUDIO IMMERSION STREAM OUTPUT TO AN AUDIO OUTPUT DEVICE — 810

FIG. 8

PREDICTED AUDIO IMMERSION RELATED TO AUDIO CAPTURE DEVICES WITHIN AN AUDIO ENVIRONMENT

CROSS REFERENCE TO RELATED APPLICATIONS

This application claims the benefit of U.S. Provisional Patent Application No. 63/486,545, titled "PREDICTED AUDIO IMMERSION RELATED TO AUDIO CAPTURE DEVICES WITHIN AN AUDIO ENVIRONMENT," and filed on Feb. 23, 2023, the entirety of which is hereby incorporated by reference.

TECHNICAL FIELD

Embodiments of the present disclosure relate generally to audio processing and, more particularly, to applying machine learning and digital signal processing to audio signals.

BACKGROUND

An array of microphones may be employed to capture audio from an audio environment. Respective microphones of an array of microphones are often located at fixed positions within an audio environment and often employ beamforming to capture audio from a source of audio. However, a location of a source of audio captured by an array of microphones may change within an audio environment.

BRIEF SUMMARY

Various embodiments of the present disclosure are directed to apparatuses, systems, methods, and computer readable media for predicted audio immersion related to audio capture devices within an audio environment. These characteristics as well as additional features, functions, and details of various embodiments are described below. The claims set forth herein further serve as a summary of this disclosure.

BRIEF DESCRIPTION OF THE DRAWINGS

Figure 1:
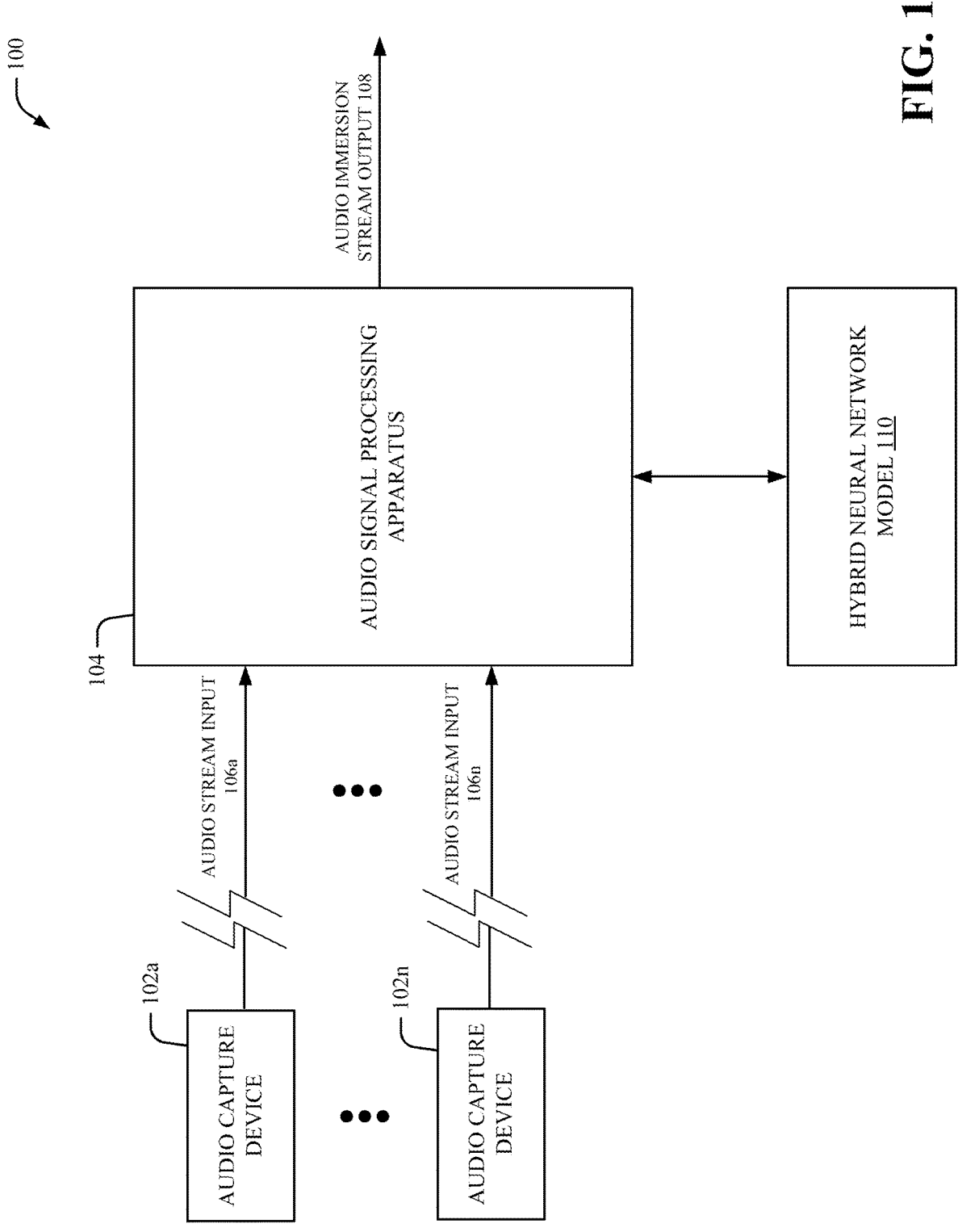
Figure 2:
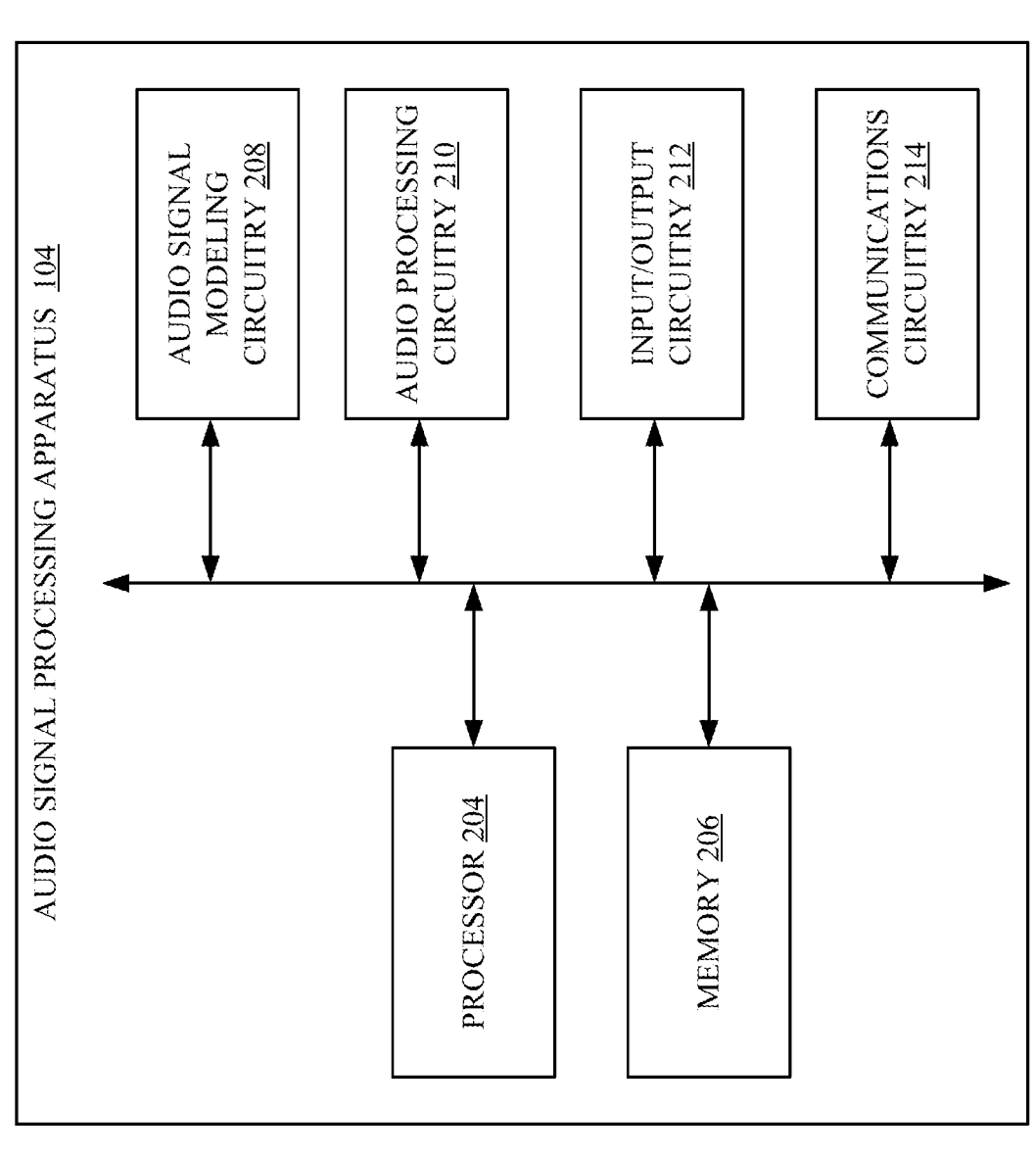
Figure 3:
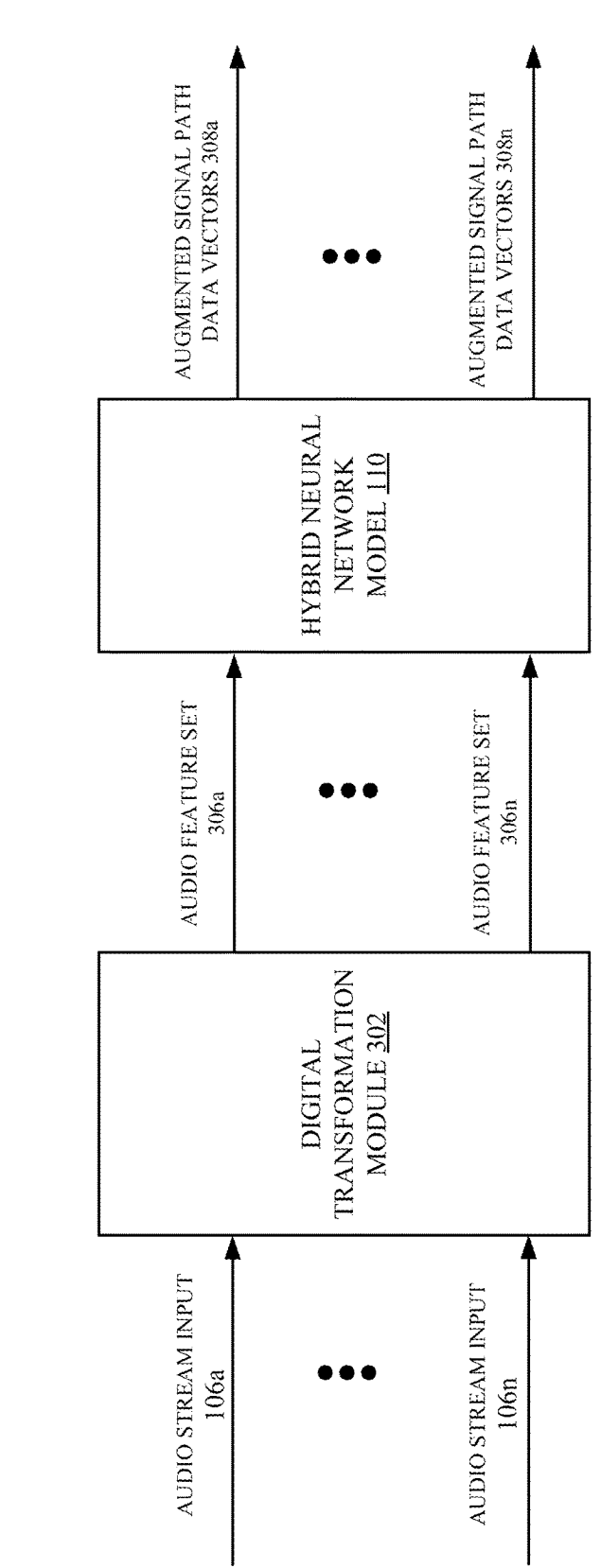
Figure 4:
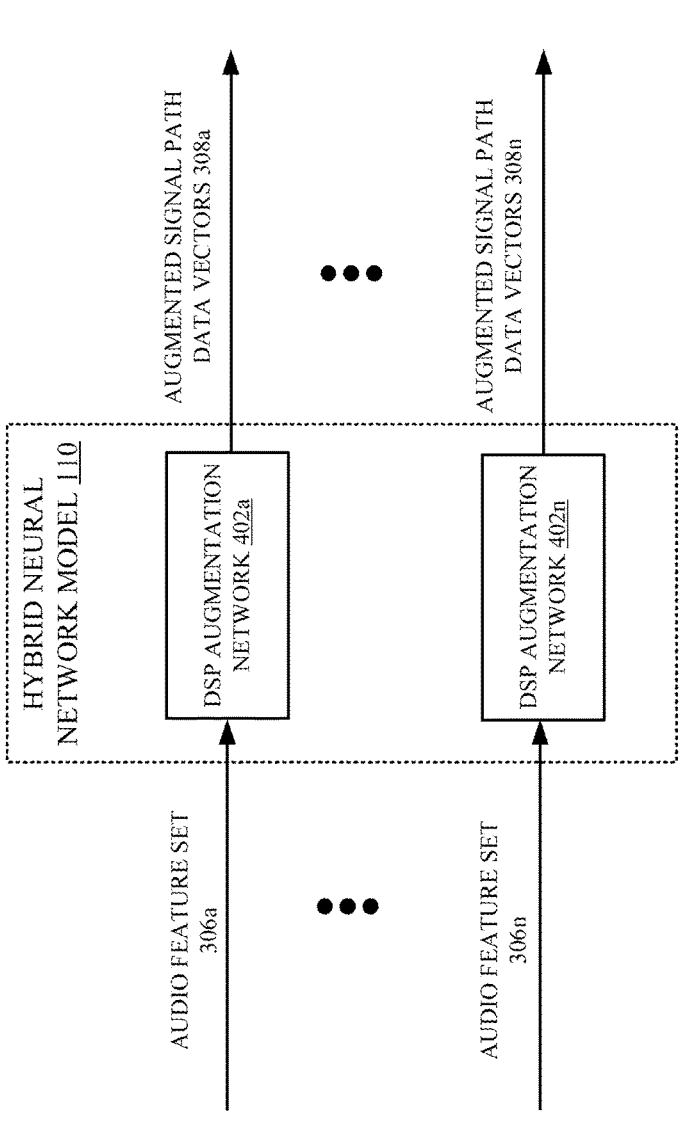
Figure 5:
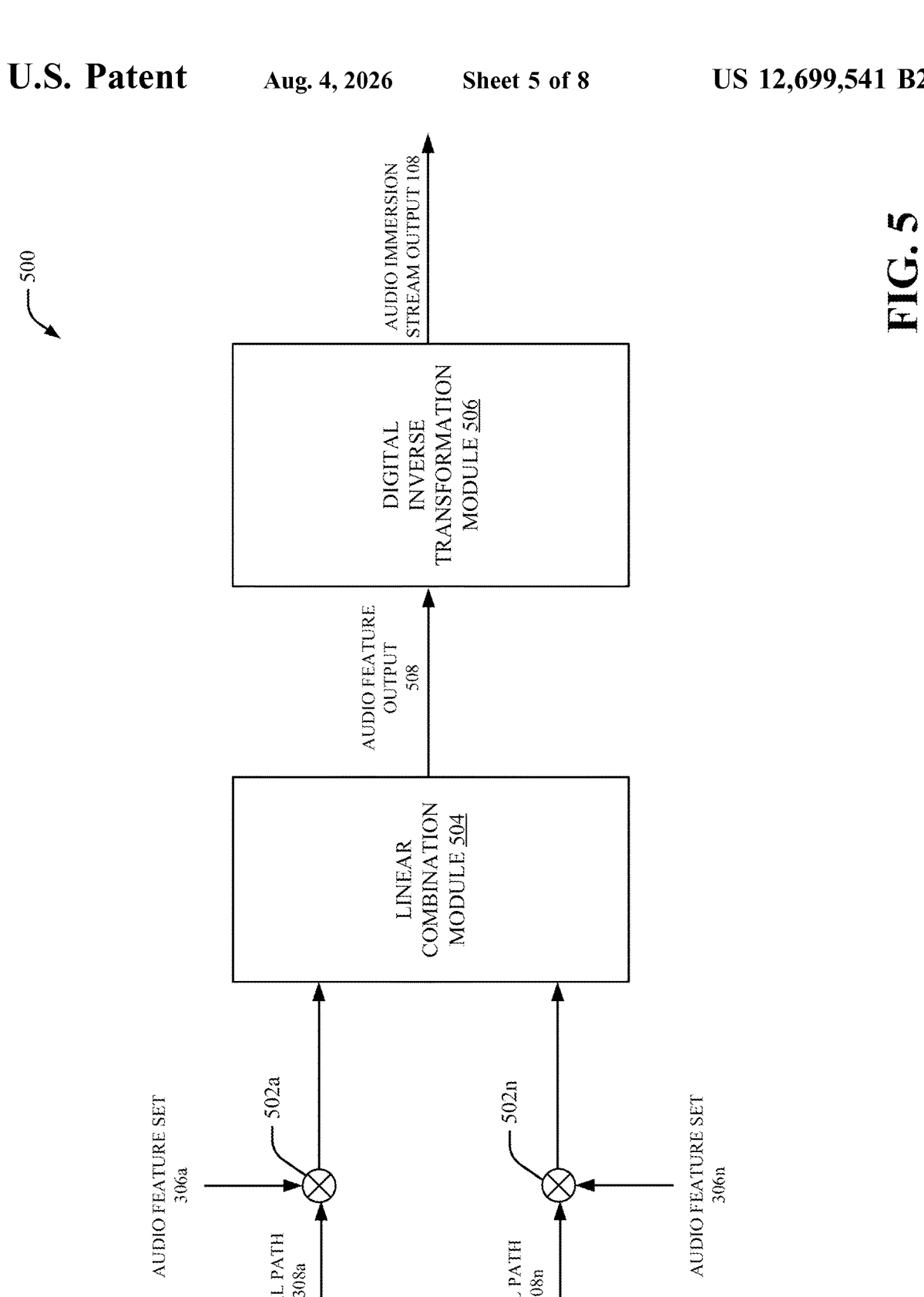
Figure 6:
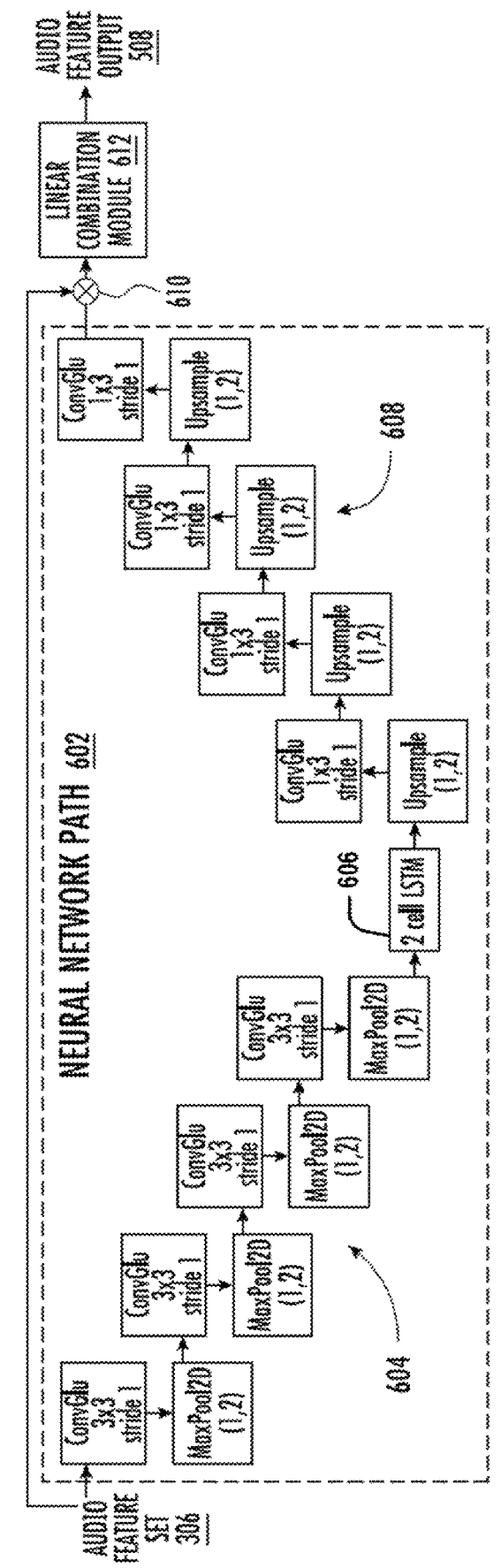
Figure 7:
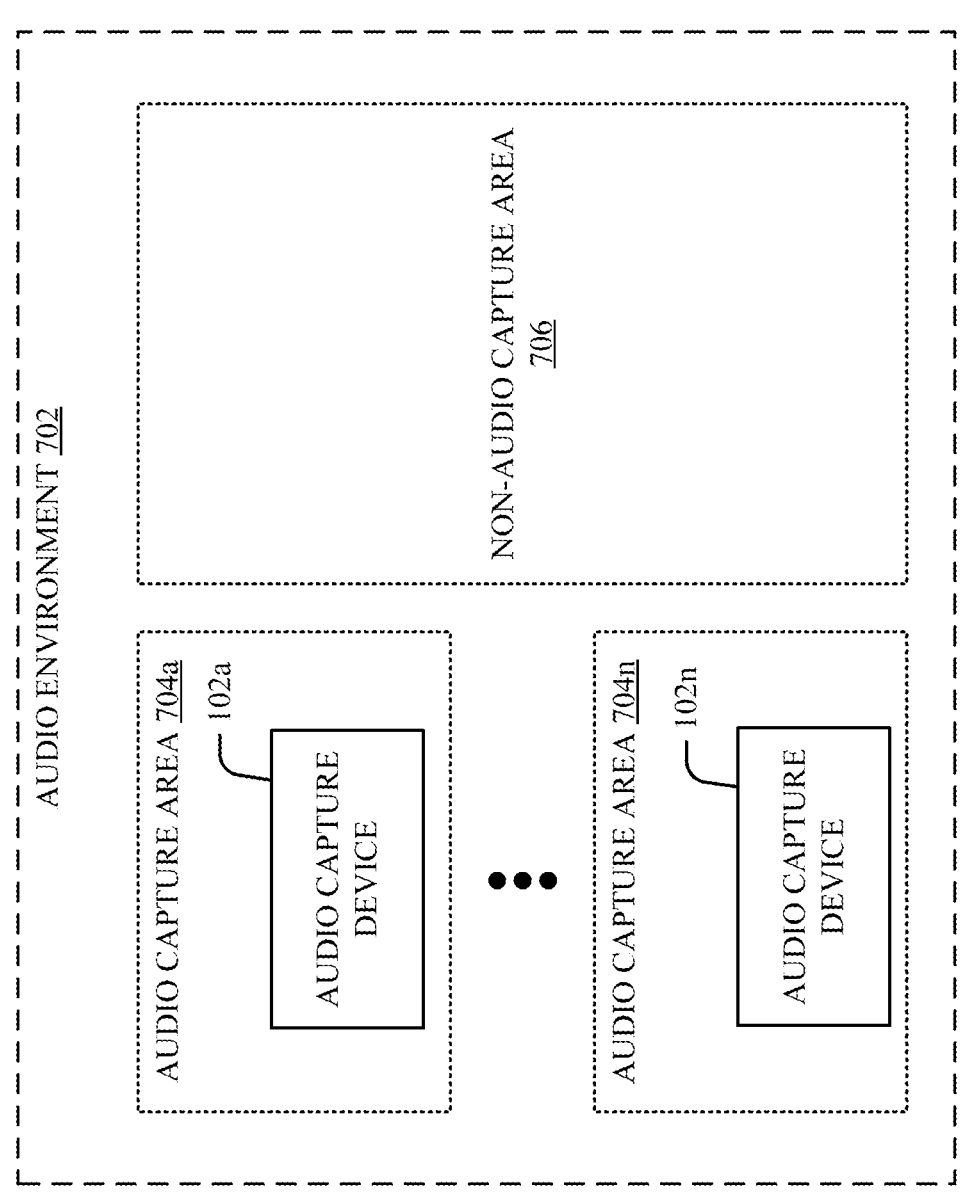

Having thus described some embodiments in general terms, reference will now be made to the accompanying drawings, which are not necessarily drawn to scale, and wherein:

FIG. 1 illustrates an example audio signal processing system that comprises audio capture devices, an audio signal processing apparatus, and a hybrid neural network model in accordance with one or more embodiments disclosed herein;

FIG. 2 illustrates an example audio signal processing apparatus configured in accordance with one or more embodiments disclosed herein;

FIG. 3 illustrates an example subsystem for processing audio stream input for employment by a hybrid neural network model in accordance with one or more embodiments disclosed herein;

FIG. 4 illustrates an example subsystem for filtering audio feature sets via a hybrid neural network model in accordance with one or more embodiments disclosed herein;

FIG. 5 illustrates an example subsystem for combining audio feature sets with augmented signal path data vectors in accordance with one or more embodiments disclosed herein;

FIG. 6 illustrates an example subsystem for neural network processing in accordance with one or more embodiments disclosed herein;

FIG. 7 illustrates an example audio environment in accordance with one or more embodiments disclosed herein; and FIG. 8 illustrates an example method for providing hybrid machine learning and digital signal processing modeling related to audio captured from an audio environment in accordance with one or more embodiments disclosed herein.

DETAILED DESCRIPTION

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements.

Overview

A typical audio system for capturing audio within an audio environment may contain a microphone array, a beamforming module, and/or other digital signal processing (DSP) elements. For example, a beamforming module may be configured to combine microphone signals captured by a microphone array using one or more DSP processing techniques. Typically, beamforming lobes of a microphone array may be directed to capture audio at fixed locations within an audio environment. However, traditional beamforming techniques often involve numerous microphone elements, expensive hardware, and/or manual setup for beam steering or microphone placement in an audio environment.

Additionally, since certain types of audio sources such as a human talker in an audio environment may dynamically change location within the audio environment, beamforming lobes of a microphone array are often re-steered to attempt to capture the dynamic audio source. The re-steering of beamforming lobes of a microphone array often results in inefficient usage of computing resources, inefficient data bandwidth, and/or undesirable audio delay by an audio system. For example, re-steering of beamforming lobes may involve localization processing that may inefficiently consume computational resources for an audio processing pipeline and/or may introduce error that compromises alignment of beamforming lobes with an audio source. Re-steering of beamforming lobes may also introduce delay in an audio processing pipeline in order to obtain a localization measure, thereby delaying deployment of the beamforming lobes. Moreover, re-steering beamforming lobes of a microphone array may not adequately capture each audio source in the audio environment, resulting in non-audio capture areas in an audio environment. Noise is also often introduced during audio capture related to audio systems, which may further impact intelligibility of speech and/or may produce an undesirable experience for listeners. As such, it is desirable to reduce the effect of noise in an audio environment while also reducing the number of microphone elements in a microphone system, reducing cost of hardware for the microphone system, and/or removing manual intervention to configure the microphone system.

To address these and/or other technical problems associated with traditional audio systems, various embodiments disclosed herein provide for predicted audio immersion related to audio capture devices within an audio environment. In various embodiments, respective audio capture devices located within an audio environment may capture respective audio streams from audio capture subareas of the audio environment. The respective audio streams may be provided as input to a hybrid neural network model to produce audio immersion stream output. The hybrid neural network model may integrate DSP with machine learning to produce the audio immersion stream output. The audio immersion stream output may provide the predicted audio immersion for both the audio capture subareas of the audio environment and one or more non-audio capture subareas of the audio environment.

Exemplary Systems and Methods for Predicted Audio Immersion

FIG. 1 illustrates an audio signal processing system 100 that is configured to provide predicted audio immersion related to audio capture devices within an audio environment according to one or more embodiments of the present disclosure. The audio signal processing system 100 may be, for example, a conferencing system (e.g., a conference audio system, a video conferencing system, a digital conference system, etc.), an audio performance system, an audio recording system, a music performance system, a music recording system, a digital audio workstation, a lecture hall microphone systems, a broadcasting microphone system, an augmented reality system, a virtual reality system, an online gaming system, or another type of audio system. Additionally, the audio signal processing system 100 may be implemented as an audio signal processing apparatus and/or as software that is configured for execution on a smartphone, a laptop, a personal computer, a digital conference system, a wireless conference unit, an audio workstation device, an augmented reality device, a virtual reality device, a recording device, headphones, earphones, speakers, or another device.

The audio signal processing system 100 may provide improved audio quality for microphone signals in an audio environment. An audio environment may be an indoor environment, an outdoor environment, a room, a performance hall, a broadcasting environment, a virtual environment, or another type of audio environment. In various examples, the audio signal processing system 100 may be configured provide noise reduction, noise cancellation, denoising, dereverberation, and/or other filtering of undesirable sound with respect to microphone signals via audio signal modeling. The audio signal modeling may be provided via a hybrid neural network model associated with machine learning and digital signal processing.

In some examples, the audio signal processing system 100 may remove noise from speech-based audio signals captured via two or more microphones located within an audio environment. For example, an improved audio processing system may be incorporated into microphone hardware for use when a microphone is in a "speech" mode. Additionally, in some examples, the audio signal processing system 100 may remove noise, reverberation, and/or other audio artifacts from non-speech audio signals such as music, precise audio analysis applications, public safety tools, sporting event audio, or other non-speech audio.

The audio signal processing system 100 may include two or more audio capture devices 102a-n and an audio signal processing apparatus 104. The two or more audio capture devices 102a-n may be two or more microphones, two or more video capture devices, two or more infrared capture devices, two or more sensor devices, and/or two or more other types of audio capture devices. Alternatively, the two or more audio capture devices 102a-n may be a combination of microphones, video capture devices, infrared capture devices, sensor devices, and/or another type of audio capture device. A microphone may include, but is not limited to, a condenser microphone, a micro-electromechanical systems (MEMS) microphone, a dynamic microphone, a piezoelectric microphone, an array microphone, one or more beamformed lobes of an array microphone, a linear array microphone, a ceiling array microphone, a table array microphone, a virtual microphone, a network microphone, a ribbon microphone, or another type of microphones configured to capture audio.

In an example where the two or more audio capture devices 102a-n are two or more microphones, the two or more audio capture devices 102a-n may be respectively configured for capturing audio by converting sound into one or more electrical signals. In various examples, audio captured by the two or more audio capture devices 102a-n may be converted into two or more audio stream inputs 106a-n. For example, audio captured by the audio capture device 102a may be converted into audio stream input 106a, audio captured by the audio capture device 102n may be converted into audio stream input 106n, etc. Additionally, the two or more audio capture devices 102a-n may be positioned within a particular audio environment. The audio stream inputs 106a-n may be configured as respective electrical signals. In certain examples, the audio stream inputs 106a-n may be configured as respective digital audio streams. In certain examples, the audio stream inputs 106a-n may be configured as respective radio frequency signals.

In a non-limiting example, the two or more audio capture devices 102a-n may be eight microphones configured in a fixed geometry (e.g., seven microphones configured along a circumference of a circle and one microphone in the center of the circle). However, it is to be appreciated that, in certain examples, the two or more audio capture devices 102a-n may be configured in a different manner within an audio environment.

The two or more audio capture devices 102a-n may also be positioned within the audio environment. For example, the two or more audio capture devices 102a-n may be positioned within one or more audio capture areas of the audio environment. The audio environment may also include one or more non-audio capture areas where the two or more audio capture devices 102a-n are unable to capture audio and/or where it may be beneficial to determine additional audio data for the audio environment as compared to audio captured by the two or more audio capture devices 102a-n in the one or more audio capture areas of the audio environment.

The audio signal processing apparatus 104 may employ a hybrid neural network model 110 to convert the two or more audio stream inputs 106a-n into an audio immersion stream output 108. For example, to facilitate generation of the audio immersion stream output 108, the audio signal processing apparatus 104 may transform respective audio stream inputs from the two or more audio stream inputs 106a-n into respective audio feature sets. The respective audio feature sets may represent physical features and/or perceptual features related to a respective audio stream input from the two or more audio stream inputs 106a-n. For instance, an audio feature set may comprise features such as: audio spectrum, magnitude, phase, pitch, harmonic, Mel-frequency cepstral coefficients (MFCC), performance, performance sequencer, tempo, time signature, and/or one or more other types of features associated with a respective audio stream input from the two or more audio stream inputs 106a-n.

The magnitude features may represent physical features of a respective audio stream input from the two or more audio stream inputs 106a-n such as magnitude measurements with respect a respective audio stream input from the two or more audio stream inputs 106a-n. The phase features may represent physical features of a respective audio stream input from the two or more audio stream inputs 106a-n such as phase measurements with respect to a respective audio stream input from the two or more audio stream inputs 106a-n The pitch features may represent perceptual features of a respective audio stream input from the two or more audio stream inputs 106a-n such as frequency characteristics related to pitch for a respective audio stream input from the two or more audio stream inputs 106a-n. The harmonic features may represent perceptual features of a respective audio stream input from the two or more audio stream inputs 106a-n such as frequency characteristics related to harmonics for a respective audio stream input from the two or more audio stream inputs 106a-n.

The MFCC features may represent physical features of a respective audio stream input from the two or more audio stream inputs 106a-n such as MFCC measurements with respect to a respective audio stream input from the two or more audio stream inputs 106a-n. The MFCC measurements may be extracted based on windowing operations, digital transformations, and/or warping of frequencies on a Mel frequency scale with respect to a respective audio stream input from the two or more audio stream inputs 106a-n.

The performance features may represent perceptual features of a respective audio stream input from the two or more audio stream inputs 106a-n such as audio characteristics related to performance of a respective audio stream input from the two or more audio stream inputs 106a-n. In various examples, the performance features may be obtained via one or more audio analyzers that analyze performance of a respective audio stream input from the two or more audio stream inputs 106a-n. The performance sequencer features may represent perceptual features of a respective audio stream input from the two or more audio stream inputs 106a-n such as audio characteristics related to performance of a respective audio stream input from the two or more audio stream inputs 106a-n as determined by one or more audio sequencers that analyze characteristics of a respective audio stream input from the two or more audio stream inputs 106a-n.

The tempo features may represent perceptual features of a respective audio stream input from the two or more audio stream inputs 106a-n such as beats per minute characteristics related to tempo for a respective audio stream input from the two or more audio stream inputs 106a-n. The time signature features may represent perceptual features of a respective audio stream input from the two or more audio stream inputs 106a-n such as beats per musical measure characteristics related to a time signature for a respective audio stream input from the two or more audio stream inputs 106a-n.

The respective audio feature sets may be provided as input to the hybrid neural network model 110. The hybrid neural network model 110 may be configured to generate respective augmented signal path data vectors for the respective audio stream inputs from the two or more audio stream inputs 106a-n. An augmented signal path data vector may include augmented audio stream data for a signal path associated with a particular audio stream input captured by a particular audio capture device. Augmented audio stream data included in an augmented signal path data vector may comprise: one or more: audio features, spectrum features, audio characteristics, audio predictions, audio inferences, filtering predictions, DSP predictions, localization information, magnitude information, phase information, pitch information, harmonic information, and/or other data not included in an audio feature set from the respective audio feature sets.

Additionally, respective neural network paths of the hybrid neural network model 110 may process one or more audio feature sets based on respective DSP augmentation networks integrated within the hybrid neural network model 110. For example, respective neural network paths of the hybrid neural network model 110 may process the respective audio feature sets based on respective DSP augmentation networks integrated within the hybrid neural network model 110. Alternatively, each of the respective neural network paths of the hybrid neural network model 110 may process each of the audio feature sets based on respective DSP augmentation networks integrated within the hybrid neural network model 110. A DSP augmentation network may be configured for altering, filtering and/or augmentation of audio features. The altering, filtering and/or augmentation of audio features may be related to isolation, channelization, modification, and/or combination of audio features for audio. The altering, filtering and/or augmentation of audio features may also be employed to augment features employed for machine learning and/or generated by a machine learning process.

To generate the audio immersion stream output 108, the audio signal processing apparatus 104 may apply the respective augmented signal path data vectors to the respective audio feature sets. The audio immersion stream output 108 may be an enhanced audio stream for the audio environment. The audio immersion stream output 108 may provide audio output for both the one or more audio capture areas and the one or more non-audio capture areas of the audio environment. In an example, the audio immersion stream output 108 may provide predicted audio immersion for both the one or more audio capture areas and the one or more non-audio capture areas of the audio environment. For example, the predicted audio immersion may provide an audio immersion stream that includes audio associated with areas within the audio environment that include one or more microphones and other areas within the audio environment that do not include a microphone. The predicted audio immersion may be virtualized audio or other augmented audio to expand an audio field of the audio environment for a listener. In certain examples, the audio immersion stream output 108 may provide predicted audio immersion for areas within the audio environment that are deemed to include signals of interest. For instance, certain areas with certain types of undesirable audio that are deemed to not be signals of interest (e.g., such as reverberation, noise, etc.) may be removed and/or excluded from the audio immersion stream output 108. In certain examples, the audio immersion stream output 108 may additionally or alternatively provide location information (e.g., localization information) related to one or more audio sources within the audio environment.

In various examples, the audio immersion stream output 108 may be transmitted to respective output channels for further audio signal processing and/or output via an audio output device such as, but not limited to, a listening device, a digital conference system, a wireless conference unit, an audio workstation device, an augmented reality device, a virtual reality device, a recording device, or another type of audio output device. In some examples, a listening device includes headphones, earphones, in ear monitors, speakers, array speakers, sound bars, or another type of listening device. The audio immersion stream output 108 may additionally or alternatively be transmitted to one or more subsequent digital signal processing stages and/or one or more subsequent machine learning processes.

In various examples, the audio immersion stream output 108 may also be configured for reconstruction by one or more receivers. For example, the audio immersion stream output 108 may be configured for one or more receivers associated with a teleconferencing system, a video conferencing system, a virtual reality system, an online gaming system, a metaverse system, a recording system, and/or another type of system. In certain embodiments, the one or more receivers may be one or more far-end receivers configured for real-time spatial scene reconstruction. Additionally, the one or more receivers may be one or more codecs configured for teleconferencing, videoconferencing, one or more virtual reality applications, one or more online gaming applications, one or more recording applications, and/or one or more other types of codecs.

The audio immersion stream output 108 may be an improved audio stream with reduced noise, reverberation, and/or other undesirable audio artifacts with respect to the audio stream inputs 106a-n. For example, the audio immersion stream output 108 may maintain desired audio (e.g., voice audio) from the audio stream inputs 106a-n while also providing denoising, noise reduction, noise cancellation, dereverberation, and/or other audio enhancement. The audio immersion stream output 108 may additionally or alternatively provide the desired audio (e.g., related to each voice audio source in an audio environment) with improved audio quality such as, for example, with higher bandwidth, less reverberance, improved audio magnitude, improved audio pitch, etc. as compared to the audio stream inputs 106a-n.

Moreover, the audio signal processing apparatus 104 may employ fewer computing resources when compared to traditional audio processing systems that are used for digital signal processing. Additionally or alternatively, the audio signal processing apparatus 104 may be configured to deploy fewer memory resources allocated to denoising, dereverberation, and/or other audio filtering for an audio signal sample such as, for example, the audio stream inputs 106a-n. In still other examples, the audio signal processing apparatus 104 may be configured to improve processing speed of denoising operations, dereverberation operations, and/or audio filtering operations. The audio signal processing apparatus 104 may also be configured to reduce a number of computational resources associated with applying machine learning models such as, for example, the hybrid neural network model 110, to the task of denoising, dereverberation, and/or audio filtering. These improvements may enable an improved audio processing system to be deployed in microphones or other hardware/software configurations where processing and memory resources are limited, and/or where processing speed and efficiency is important.

FIG. 2 illustrates an example audio signal processing apparatus 104 configured in accordance with one or more embodiments of the present disclosure. The audio signal processing apparatus 104 may be configured to perform one or more techniques described in FIG. 1 and/or one or more other techniques described herein.

The audio signal processing apparatus 104 may be a computing system communicatively coupled with one or more circuit modules related to wireless audio processing. In some examples, the audio signal processing apparatus 104 may be a computing system communicatively coupled with, and configured to control, one or more circuit modules associated with wireless audio processing. The audio signal processing apparatus 104 may comprise or otherwise be in communication with a processor 204, a memory 206, audio signal modeling circuitry 208, audio processing circuitry 210, input/output circuitry 212, and/or communications circuitry 214. In some examples, the processor 204 (which may comprise multiple or co-processors or any other processing circuitry associated with the processor) may be in communication with the memory 206.

The memory 206 may comprise non-transitory memory circuitry and may comprise one or more volatile and/or non-volatile memories. In some examples, the memory 206 may be an electronic storage device (e.g., a computer readable storage medium) configured to store data that may be retrievable by the processor 204. In some examples, the data stored in the memory 206 may comprise radio frequency signal data, audio data, stereo audio signal data, mono audio signal data, or the like, for enabling the apparatus to carry out various functions or methods in accordance with embodiments of the present disclosure, described herein.

In some examples, the processor 204 may be embodied in a number of different ways. For example, the processor 204 may be embodied as one or more of various hardware processing means such as a central processing unit (CPU), a microprocessor, a coprocessor, a DSP, a field programmable gate array (FPGA), a neural processing unit (NPU), a graphics processing unit (GPU), a system on chip (SoC), a cloud server processing element, a controller, or a processing element with or without an accompanying DSP. The processor 204 may also be embodied in various other processing circuitry including integrated circuits such as, for example, a microcontroller unit (MCU), an ASIC (application specific integrated circuit), a hardware accelerator, a cloud computing chip, or a special-purpose electronic chip. Furthermore, in some examples, the processor 204 may comprise one or more processing cores configured to perform independently. A multi-core processor may enable multiprocessing within a single physical package. Additionally or alternatively, the processor 204 may comprise one or more processors configured in tandem via a bus to enable independent execution of instructions, pipelining, and/or multithreading.

In some examples, the processor 204 may be configured to execute instructions, such as computer program code or instructions, stored in the memory 206 or otherwise accessible to the processor 204. Alternatively or additionally, the processor 204 may be configured to execute hard-coded functionality. As such, whether configured by hardware or software instructions, or by a combination thereof, the processor 204 may represent a computing entity (e.g., physically embodied in circuitry) configured to perform operations according to an embodiment of the present disclosure described herein. For example, when the processor 204 is embodied as an CPU, DSP, ARM, FPGA, ASIC, or similar, the processor may be configured as hardware for conducting the operations of an embodiment of the disclosure. Alternatively, when the processor 204 is embodied to execute software or computer program instructions, the instructions may specifically configure the processor 204 to perform the algorithms and/or operations described herein when the instructions are executed. However, in some examples, the processor 204 may be a processor of a device specifically configured to employ an embodiment of the present disclosure by further configuration of the processor using instructions for performing the algorithms and/or operations described herein. The processor 204 may further comprise a clock, an arithmetic logic unit (ALU) and logic gates configured to support operation of the processor 204, among other things.

In one or more examples, the audio signal processing apparatus 104 may comprise the audio signal modeling circuitry 208. The audio signal modeling circuitry 208 may be any means embodied in either hardware or a combination of hardware and software that is configured to perform one or more functions disclosed herein related to the hybrid neural network model 110. In one or more examples, the audio signal processing apparatus 104 may comprise the audio processing circuitry 210. The audio processing circuitry 210 may be any means embodied in either hardware or a combination of hardware and software that is configured to perform one or more functions disclosed herein related to audio processing of the audio stream inputs 106*a-n* received from the two or more audio capture devices 102*a-n* and/or audio processing related to generation of the audio immersion stream output 108.

In some examples, the audio signal processing apparatus 104 may comprise the input/output circuitry 212 that may, in turn, be in communication with processor 204 to provide output to the user and, in some examples, to receive an indication of a user input. The input/output circuitry 212 may comprise a user interface and may comprise a display. In some examples, the input/output circuitry 212 may also comprise a keyboard, a touch screen, touch areas, soft keys, buttons, knobs, or other input/output mechanisms.

In some examples, the audio signal processing apparatus 104 may comprise the communications circuitry 214. The communications circuitry 214 may be any means embodied in either hardware or a combination of hardware and software that is configured to receive and/or transmit data from/to a network and/or any other device or module in communication with the audio signal processing apparatus 104. In this regard, the communications circuitry 214 may comprise, for example, an antennae or one or more other communication devices for enabling communications with a wired or wireless communication network. For example, the communications circuitry 214 may comprise antennae, one or more network interface cards, buses, switches, routers, modems, and supporting hardware and/or software, or any other device suitable for enabling communications via a network. Additionally or alternatively, the communications circuitry 214 may comprise the circuitry for interacting with the antenna/antennae to cause transmission of signals via the antenna/antennae or to handle receipt of signals received via the antenna/antennae.

FIG. 3 illustrates a subsystem 300 for processing audio stream input for employment by a hybrid neural network model according to one or more embodiments of the present disclosure. The subsystem 300 comprises a digital transformation module 302 and the hybrid neural network model 110. The digital transformation module 302 may be executed by the audio signal modeling circuitry 208 and/or another portion of the audio signal processing apparatus 104.

The digital transformation module 302 may receive the two or more audio stream inputs 106*a-n*. Additionally, the digital transformation module 302 may be configured to perform one or more digital transformations with respect to the two or more audio stream inputs 106*a-n* to generate two or more audio features sets 306*a-n* for employment by the hybrid neural network model 110.

Each of the audio features sets 306*a-n* may comprise respective digitized data related to audio captured by an audio capture device of the two or more audio capture devices 102*a-n*. For example, each of the audio features sets 306*a-n* may comprise a digital representation of audio captured by an audio capture device of the two or more audio capture devices 102*a-n*. The digitized data may include, for example, a spectrogram representation of audio, a wavelet audio representation of audio, a short-term Fourier transform (STFT) representation of audio, a time-domain representation of audio, a psychoacoustical scale representation associated with energy in frequency bands of the audio (e.g., a Bark scale, a logarithmic scale, etc.), an MFCC representation of the audio, or another type of audio transformation representation. The two or more audio features sets 306*a-n* may be provided as input to the hybrid neural network model 110.

Based on machine learning with respect to the two or more audio features sets 306*a-n*, the hybrid neural network model 110 may generate two or more augmented signal path data vectors 308*a-n*. At least one augmented signal path data vector from the two or more augmented signal path data vectors 308*a-n* may include augmented audio stream data for a signal path associated with a respective audio stream input. For example, at least the augmented signal path data vector 308*a* may include augmented audio stream data for a signal path associated with the audio stream input 106*a* captured by the audio capture device 102*a*. Augmented audio stream data included in an augmented signal path data vector may comprise: one or more: audio features, spectrum features, audio characteristics, audio predictions, audio inferences, filtering predictions, DSP predictions, localization information, magnitude information, phase information, pitch information, harmonic information, and/or other data not included in an audio feature set from the two or more audio feature sets 306*a-n*. Additionally, two or more augmented signal path data vectors 308*a-n* may be input dependent such that two or more augmented signal path data vectors 308*a-n* may be dynamically configured when input audio features change. In an example, the two or more augmented signal path data vectors 308*a-n* may be configured as respective filter mask data structures (e.g., respective filter kernel data structures) associated with DSP feature predictions. For instance, a DSP feature prediction may represent predicted audio features for one or more DSP processes implemented in an audio processing pipeline associated with the audio stream inputs 106*a-n*. In some examples, the predicted audio features for the one or more DSP processes may represent a filter (e.g., a filter mask) for the one or more DSP processes. The one or more DSP processes may occur in the audio processing pipeline after the hybrid neural network model 110. In another example, the two or more augmented signal path data vectors 308*a-n* may be configured as respective DSP filters for employment by one or more DSP processes implemented in an audio processing pipeline after the hybrid neural network model 110. In certain examples, the two or more augmented signal path data vectors 308*a-n* may be additionally configured based on one or more historical augmented signal path data vectors determined by the hybrid neural network model 110. For example, the augmented audio stream data included in an augmented signal path data vector may be configured and/or weighted based on historical augmented audio stream data provided by a respective DSP augmentation network and/or one or more other DSP augmentation networks.

FIG. 4 illustrates a subsystem 400 for filtering audio feature sets via a hybrid neural network model according to one or more embodiments of the present disclosure. The subsystem 400 comprises the hybrid neural network model 110. As illustrated in FIG. 4, the hybrid neural network model 110 may include two or more DSP augmentation networks 402*a-n*. Machine learning processing provided by
the hybrid neural network model 110 may be executed by the
audio signal modeling circuitry 208 and/or another portion
of the audio signal processing apparatus 104.

The two or more DSP augmentation networks 402*a-n* may
be integrated within with the hybrid neural network model
110 to optimize DSP functionality of audio processing
following the machine learning. The DSP augmentation
networks 402*a-n* may be respectively configured as a neural
network (e.g., a neural network path, a neural network block,
etc.) of the hybrid neural network model 110. In certain
examples, the DSP augmentation networks 402*a-n* may be
respectively configured as a digital filter such as a multiple-
input multiple-output (MIMO) filter or another type of filter
configured for altering and/or filtering of audio via machine
learning. In various examples, the two or more DSP aug-
mentation networks 402*a-n* may isolate, channelize, modify,
and/or combine audio features from a respective audio
feature set 306*a-n*. For example, the DSP augmentation
network 402*a* may isolate, channelize, modify, and/or com-
bine audio features from the audio feature set 306*a* to allow
a DSP augmented version of the audio features to be further
processed via one or more machine learning techniques. In
some examples, a respective DSP augmentation network
402*a-n* may provide a DSP feature prediction via a respec-
tive neural network paths based at least in part on non-linear
characteristics and/or signal path characteristics associated
with one or more of the respective audio stream inputs
106*a-n*. For example, a respective DSP augmentation net-
work 402*a-n* may provide a DSP feature prediction via a
respective neural network paths based at least in part on
features of the audio feature sets 306*a-n* related to non-linear
characteristics and/or signal path characteristics. The non-
linear characteristics may include non-linear behavior and/
or properties of the one or more of the respective audio
stream inputs 106*a-n*. The signal path characteristics may
include behavior, conditions, and/or properties of one or
more signal paths associated with the one or more of the
respective audio stream inputs 106*a-n*. In some examples, a
signal path may be a communication channel In some examples, the two or more DSP augmentation
networks 402*a-n* may isolate, channelize, modify, and/or
combine audio features from the audio feature set 306*a* to
allow a DSP augmented version of the audio features to be
combined with a modeled version of the audio features as
determine via the or more machine learning techniques. The
one or more machine learning techniques may employ deep
learning related to neural network paths, convolutional lay-
ers, max pooling, gated linear units, upsampling, and/or
other machine learning. For instance, a contracting path
portion of a respective neural network path of the hybrid
neural network model 110 may be configured with respec-
tive layers associated with convolutional layers, max pool-
ing and/or gated linear units. Additionally, an expansive path
portion of a respective neural network path of the hybrid
neural network model 110 may be configured with different
respective layers associated with convolutional layers, max
pooling and/or gated linear units based on degree of down-
sampling provided by the contracting path portion.

To provide the hybrid machine learning/DSP functionality
for the hybrid neural network model 110, neural network
paths of the hybrid neural network model 110 may be
configured based on parameters of a respective DSP aug-
mentation network from the DSP augmentation networks
402*a-n*. For example, a degree of stride (e.g., an amount of
movement based on a degree of filtering) and/or a number of
contracting/expansive paths for respective neural network paths of the hybrid neural network model 110 may be
configured based on parameters of a respective DSP aug-
mentation network from the DSP augmentation networks
402*a-n*. The parameters may include hyper-parameters,
weights, configuration variables, trainable parameters, and/
or another type of parameter for a respective DSP augmen-
tation network.

The hybrid neural network model 110 may be trained
based on an audio feature training set associated with
correlation features between the DSP augmentation net-
works 402*a-n* and respective neural network paths of the
hybrid neural network model 110. In some examples, the
correlation features may be between one or more outputs
and one or more inputs associated with the DSP augmenta-
tion networks 402*a-n* and/or respective neural network paths
of the hybrid neural network model 110. Additionally,
hybrid neural network model 110 may be trained based on
an audio feature training set associated with features for
noise reduction, noise cancellation, dereverberation, aug-
menting band-limited beamforming microphone array
audio, sound source separation, sound source location esti-
mation, adaptive preprocessing, and/or adaptive postpro-
cessing. In certain examples, a training process for the
hybrid neural network model 110 may optimize weights of
the hybrid neural network model 110 based on a backend
DSP process. For example, a training process for the hybrid
neural network model 110 may optimize weights of the
hybrid neural network model 110 based on a DSP process
associated with linear combination that is implemented in an
audio processing pipeline after the hybrid neural network
model 110.

FIG. 5 illustrates a subsystem 500 for combining audio
feature sets with augmented signal path data vectors accord-
ing to one or more embodiments of the present disclosure.
The subsystem 500 comprises audio combiners 502*a-n*, a
linear combination module 504 and a digital inverse trans-
formation module 506. The audio combiners 502*a-n*, linear
combination module 504 and/or the digital inverse transfor-
mation module 506 may be executed by the audio process-
ing circuitry 210 and/or another portion of the audio signal
processing apparatus 104. Additionally, audio combiners
502*a-n*, linear combination module 504 and/or the digital
inverse transformation module 506 may represent one or
more DSP processes in an audio processing pipeline after the
machine learning provided by the hybrid neural network
model 110.

Respective augmented signal path data vectors from the
augmented signal path data vectors 308*a-n* may be opti-
mized by the hybrid neural network model 110 to produce
DSP filtering that minimizes a difference between a desired
output provided by the audio immersion stream output 108
and an actual output provided by the audio immersion
stream output 108. In some examples, respective augmented
signal path data vectors from the augmented signal path data
vectors 308*a-n* may be combined with respective audio
feature sets from the audio feature sets 306*a-n* via respective
audio combiners 502*a-n*. The audio combiners 502*a-n* may
be configured as audio multipliers to combine respective
augmented signal path data vectors from the augmented
signal path data vectors 308*a-n*. An audio combiner may be
an audio component configured to mix two signals together
to produce an output that represents a mixed version of the
two signals. An audio multiplier may be an audio component
configured to multiply two signals (e.g., via element-wise
multiplication, etc.) to produce an output that represents a
product of the two signals. Additionally or alternatively, the
audio combiners 502*a-n* may be configured to perform audio convolution to combine respective augmented signal path data vectors from the augmented signal path data vectors 308a-n. The linear combination module 504 may combine output from the respective audio combiners 502a-n to provide audio feature output 508. The audio feature output 508 may be configured as a spectrogram representation of augmented signal path data for the audio stream inputs 106a-n, a wavelet audio representation of augmented signal path data for the audio stream input, an STFT representation of augmented signal path data for the audio stream inputs 106a-n, a time-domain representation of augmented signal path data for the audio stream inputs 106a-n, a psychoacoustical representation (e.g., a Bark scale representation, a logarithmic representation, etc.) of augmented signal path data for the audio stream inputs 106a-n, an MFCC representation of augmented signal path data for the audio stream inputs 106a-n, or another type of audio representation of augmented signal path data for the audio stream inputs 106a-n.

In some examples, one or more portions of the audio feature output 508 may be employed to retrain one or more portions of the hybrid neural network model 110. For instance, one or more weights for one or more of the DSP augmentation networks 402a-n of the hybrid neural network model 110 may be altered based on one or more portions of the audio feature output 508.

The digital inverse transformation module 506 may be configured to perform one or more digital transformations with respect to the audio feature output 508 to generate the audio immersion stream output 108. A digital transformation provided by the digital inverse transformation module 506 may include an inverse STFT transform, an inverse time-domain transform, an inverse psychoacoustical transform (e.g., an inverse Bark scale transform, an inverse logarithmic transform, etc.), an inverse MFCC transform, and/or another type of digital transformation to provide the audio immersion stream output 108 in an audio format that corresponds to an audio format of the audio stream inputs 106a-n.

In some examples, the audio immersion stream output 108 may be an improved audio stream with reduced noise, reverberation, and/or other undesirable audio artifacts with respect to the audio stream inputs 106a-n. In some examples, the audio immersion stream output 108 may be an encoded audio signal. For example, the audio immersion stream output 108 may be encoded in a 3D audio format (e.g., MPEG-H, a 3D audio format related to ISO/IEC 23008-3, another type of 3D audio format, etc.). The audio immersion stream output 108 may additionally or alternatively be configured for reconstruction by one or more receivers. For example, the audio immersion stream output 108 may be configured for one or more receivers associated with a teleconferencing system, a video conferencing system, a virtual reality system, an online gaming system, a metaverse system, a recording system, and/or another type of system. In certain examples, the one or more receivers may be one or more far-end receivers configured for real-time spatial scene reconstruction. Additionally, the one or more receivers may be one or more codecs configured for teleconferencing (e.g., 2D teleconferencing or 3D teleconferencing), videoconferencing (e.g., 2D videoconferencing or 3D videoconferencing), one or more virtual reality applications, one or more online gaming applications, one or more recording applications, and/or one or more other types of codecs. In some examples, a recording device of a recording system may be configured for playback based on the 3D audio format. A recording device of a recording system may additionally or alternatively be configured for playback associated with teleconferencing (e.g., 2D teleconferencing or 3D teleconferencing), videoconferencing (e.g., 2D videoconferencing or 3D videoconferencing), virtual reality, online gaming, a metaverse, and/or another type of audio application.

In some examples, the audio immersion stream output 108 may be correlated to a zone of the audio environment and/or to a Voronoi map associated with the audio environment. The Voronoi map may include size information and/or location information for the audio environment to facilitate portioning the audio environment into respective zones. In certain examples, the audio immersion stream output 108 may be further employed by a classifier model for sound identification and/or other audio classification related to the audio environment.

FIG. 6 illustrates a subsystem 600 for neural network processing according to one or more embodiments of the present disclosure. The subsystem 600 comprises a neural network path 602. The neural network path 602 may be executed by the audio signal modeling circuitry 208 and/or another portion of the audio signal processing apparatus 104.

The neural network path 602 may be a neural network path of the hybrid neural network model 110 to provide machine learning processing with respect to a particular audio feature set 306 from the audio feature sets 306a-n. In various examples, the neural network path 602 may represent a DSP augmentation network from the DSP augmentation networks 402a-n. The neural network path 602 may include a contracting path portion 604, a long short-term memory (LSTM) layer 606, and an expansive path portion 608. The LSTM layer 606 may be implemented between the contracting path portion 604 and the expansive path portion 608. In one or more examples, the neural network path 602 may be configured with an encoder/decoder network associated with machine learning. For example, the neural network path 602 may be configured with a U-Net architecture associated with deep learning. Additionally, the neural network path 602 may include one or more encoders and/or one or more decoders to facilitate the deep learning.

The contracting path portion 604 may be configured for downsampling and the expansive path portion 608 may be configured for upsampling. For example, the contracting path portion 604 may be configured with respective layers associated with convolutional layers, max pooling and/or gated linear units to provide downsampling. Additionally, the expansive path portion 608 may be configured with different respective layers associated with convolutional layers, max pooling and/or gated linear units based on degree of downsampling provided by the contracting path portion 604. The LSTM layer 606 may be configured to capture features determined by the contracting path portion 604 and/or to provide the features to the expansive path portion 608 for further processing. Output features provided by the neural network path 602 may be combined with the audio feature set 306 via a combiner 610 and/or a linear combination module 612 to provide at least a portion of the audio feature output 508. For example, one or more filter masks and/or one or more DSP filters provided by the neural network path 602 may be applied to the audio feature set 306. Accordingly, the subsystem 600 may provide a combination of machine learning (e.g., via the neural network path 602) and DSP processing (e.g., via the combiner 610 and/or the linear combination module 612) with respect to the audio feature set 306.

FIG. 7 illustrates an example audio environment 702 according to one or more embodiments of the present disclosure. The audio environment 702 may be an indoor environment, an outdoor environment, a room, an auditorium, a performance hall, a broadcasting environment, an arena (e.g., a sports arena), a virtual environment, or another type of audio environment. The audio environment 702 includes one or more audio capture areas 704*a-n* and a non-audio capture area 706. The audio capture areas 704*a-n* correspond to areas of the audio environment 702 where an audio capture device from the audio capture devices 102*a-n* is capable of capturing audio. For example, the audio capture area 704*a* may correspond to an area where the audio capture device 102*a* is capable of capturing audio from one or more audio sources and the audio capture area 704*n* may correspond to an area where the audio capture device 102*n* is capable of capturing audio from one or more audio sources. The audio capture area 704*a* may be different than the audio capture area 704*n*, or alternatively the audio capture area 704*a* may correspond to the audio capture area 704*n*.

The non-audio capture area 706 may be correspond to an area of the audio environment where an audio capture device from the audio capture devices 102*a-n* is not present and/or is not capable of capturing audio. For example, placement of audio capture devices and/or related beamforming directions may be directed to the one or more audio capture area 704*a-n* but not the non-audio capture area 706. In various examples, the audio capture devices 102*a-n* may be configured to extract audio content across the audio capture areas 704*a-n* but not the non-audio capture area 706. For example, the audio capture devices 102*a-n* may be configured in a fixed geometry microphone arrangement (e.g., a constellation microphone arrangement) to extract audio content across the audio capture areas 704*a-n*. In various examples, the audio immersion stream output 108 may provide predicted audio immersion for both the audio capture areas 704*a-n* and the non-audio capture area 706 of the audio environment 702.

FIG. 8 is a flowchart diagram of an example process 800, for providing hybrid machine learning and DSP modeling related to audio captured from an audio environment, in accordance with, for example, an audio signal processing apparatus 104 illustrated in FIG. 2. Via the various operations of the process 800, the audio signal processing apparatus 104 may enhance quality and/or reliability of audio associated with an audio environment. For example, the process 800 may process respective audio stream inputs associated with audio capture devices positioned within one or more audio capture areas of an audio environment, where the audio environment comprises the one or more audio capture areas and one or more non-audio capture areas.

The process 800 begins at operation 802 that receives (e.g., by the audio signal modeling circuitry 208) audio stream inputs associated with respective audio capture devices positioned within one or more audio capture areas of an audio environment, where the audio environment comprises the one or more audio capture areas and one or more non-audio capture areas. Audio captured by the audio capture devices may be converted into the audio stream inputs. The audio capture devices may be microphones, video capture devices, infrared capture devices, sensor devices, and/or another type of audio capture device. Alternatively, the audio capture devices may be a combination of microphones, video capture devices, infrared capture devices, sensor devices, and/or another type of audio capture device. Additionally, the audio stream inputs may be configured as respective electrical signals, respective digital audio streams, respective radio frequency signals, another type of audio signal.

The process 800 also includes an operation 804 that transforms (e.g., by the audio signal modeling circuitry 208) the audio stream inputs associated with the audio capture devices into respective audio feature sets. Transformation of the respective audio stream inputs may include a digital transformation of the respective audio stream inputs to provide a digital representation of the respective audio stream inputs. The digital representation may include for example, a spectrogram representation of audio, a wavelet audio representation of audio, an STFT representation of audio, a time-domain representation of audio, a psychoacoustical scale representation (e.g., a Bark scale representation, a logarithmic scale representation, etc.) of audio, an MFCC representation of audio, or another type of audio transformation representation.

An audio feature set may represent physical features and/or perceptual features related to a respective audio stream input. For instance, an audio feature set may comprise: one or more: audio spectrum features, magnitude features, phase features, pitch features, harmonic features, MFCC features, performance features, performance sequencer features, tempo features, time signature features, and/or other types of features associated with a respective audio stream input.

The process 800 also includes an operation 806 that inputs (e.g., by the audio signal modeling circuitry 208) the respective audio feature sets to a hybrid neural network model configured to generate respective augmented signal path data vectors for the audio stream inputs, wherein respective neural network paths of the hybrid neural network model process one or more of the respective audio feature sets based on respective digital signal processing (DSP) augmentation networks integrated within the hybrid neural network model. For example, each of the respective neural network paths of the hybrid neural network model may process one or more of the respective audio feature sets based on the respective DSP augmentation networks integrated within the hybrid neural network model. Alternatively, each of the respective neural network paths of the hybrid neural network model may process each of the respective audio feature sets based on the respective DSP augmentation networks integrated within the hybrid neural network model. The respective DSP augmentation networks may provide DSP feature predictions via the respective neural network paths based at least in part on non-linear characteristics and/or signal path characteristics associated with one or more of the respective audio stream inputs. A DSP feature prediction may represent predicted audio features for one or more DSP processes implemented in an audio processing pipeline associated with the audio stream inputs. The one or more DSP processes may occur in the audio processing pipeline after the hybrid neural network model. The respective neural network paths may additionally or alternatively be configured based on parameters of the respective DSP augmentation networks. In some examples the respective neural network paths may be configured as respective encoder-decoder network models, respective U-Net models or other deep learning models.

In some examples, the respective neural network paths may be trained based on an audio feature training set associated with correlation features between the DSP augmentation networks and the respective neural network paths. In some examples, the respective neural network paths may be trained based on an audio feature training set associated with features for noise reduction, noise cancellation, or dereverberation. In some examples, the respective neural network paths may be trained based on an audio feature training set associated with features for augmenting band-limited beamforming microphone array audio.

The process 800 also includes an operation 808 that applies (e.g., by the audio processing circuitry 210) the respective augmented signal path data vectors to the respective audio feature sets to generate audio immersion stream output related to the audio stream inputs, where the audio immersion stream output provides audio output for both the one or more audio capture areas and the one or more non-audio capture areas of the audio environment. In an example, the audio immersion stream output provides predicted audio immersion for both the one or more audio capture areas and the one or more non-audio capture areas of the audio environment. In some examples, the respective augmented signal path data vectors may be applied to the respective audio feature sets via linear combination. In some examples, the respective augmented signal path data vectors may be applied to the respective audio feature sets via one or more digital masking operations. In some examples, one or more digital transformations may be performed to provide the audio immersion stream output in an audio format that corresponds to an audio format of the audio stream inputs.

The process 800 also includes an operation 810 that outputs (e.g., by input/output circuitry 212) the audio immersion stream output to an audio output device. The audio output device may be one or more: speakers, array speakers, sound bars, headphones, earphones, in ear monitors, and/or other listening devices.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time.

In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Although example processing systems have been described in the figures herein, implementations of the subject matter and the functional operations described herein may be implemented in other types of digital electronic circuitry, or in computer software, firmware, or hardware, including the structures disclosed in this specification and their structural equivalents, or in combinations of one or more of them.

Embodiments of the subject matter and the operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer programs, i.e., one or more modules of computer program instructions, encoded on computer-readable storage medium for execution by, or to control the operation of, information/data processing apparatus. Alternatively, or in addition, the program instructions may be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium may be, or be included in, a computer-readable storage device, a computer-readable storage substrate, a random or serial access memory array or device, or a combination of one or more of them. Moreover, while a computer-readable storage medium is not a propagated signal, a computer-readable storage medium may be a source or destination of computer program instructions encoded in an artificially-generated propagated signal. The computer-readable storage medium may also be, or be included in, one or more separate physical components or media (e.g., multiple CDs, disks, or other storage devices).

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms, such as consisting of, consisting essentially of, comprised substantially of, and/or the like.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

While this specification contains many specific implementation details, these should not be construed as limitations on the scope of any disclosures or of what may be claimed, but rather as description of features specific to particular embodiments of particular disclosures. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a product or packaged into multiple products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Hereinafter, various characteristics will be highlighted in a set of numbered clauses or paragraphs. These characteristics are not to be interpreted as being limiting on the disclosure or inventive concept, but are provided merely as a highlighting of some characteristics as described herein, without suggesting a particular order of importance or relevancy of such characteristics.

Clause 1. An audio signal processing apparatus comprising at least one processor and a memory storing instructions that are operable, when executed by the processor, to cause the audio signal processing apparatus to: receive audio stream inputs associated with respective audio capture devices positioned within one or more audio capture areas of an audio environment.

Clause 2. The audio signal processing apparatus of clause 1, wherein the audio environment comprises the one or more audio capture areas and one or more non-audio capture areas.

Clause 3. The audio signal processing apparatus of any one of the foregoing clauses, wherein the instructions are further operable to cause the audio signal processing apparatus to: transform the audio stream inputs associated with the audio capture devices into respective audio feature sets.

Clause 4. The audio signal processing apparatus of any one of the foregoing clauses, wherein the instructions are further operable to cause the audio signal processing apparatus to: input the respective audio feature sets to a hybrid neural network model configured to generate respective augmented signal path data vectors for the audio stream inputs.

Clause 5. The audio signal processing apparatus of any one of the foregoing clauses, wherein respective neural network paths of the hybrid neural network model process one or more of the respective audio feature sets based on respective digital signal processing (DSP) augmentation networks integrated within the hybrid neural network model.

Clause 6. The audio signal processing apparatus of any one of the foregoing clauses, wherein the instructions are further operable to cause the audio signal processing apparatus to: apply the respective augmented signal path data vectors to the respective audio feature sets to generate audio immersion stream output related to the audio stream inputs.

Clause 7. The audio signal processing apparatus of any one of the foregoing clauses, wherein the audio immersion stream output provides audio output for both the one or more audio capture areas and the one or more non-audio capture areas of the audio environment.

Clause 8. The audio signal processing apparatus of any one of the foregoing clauses, wherein the instructions are further operable to cause the audio signal processing apparatus to: output the audio immersion stream output to an audio output device.

Clause 9. The audio signal processing apparatus of any one of the foregoing clauses, wherein characteristics of the audio immersion stream output differ from the audio stream inputs associated with the respective audio capture devices arranged within the one or more audio capture areas of the audio environment.

Clause 10. The audio signal processing apparatus of any one of the foregoing clauses, wherein the instructions are further operable to cause the audio signal processing apparatus to: generate DSP feature predictions via the respective neural network paths based at least in part on non-linear characteristics associated with the audio stream inputs.

Clause 11. The audio signal processing apparatus of any one of the foregoing clauses, wherein the instructions are further operable to cause the audio signal processing apparatus to: generate DSP feature predictions via the respective neural network paths based at least in part on signal path characteristics associated with the audio stream inputs.

Clause 12. The audio signal processing apparatus of any one of the foregoing clauses, wherein the instructions are further operable to cause the audio signal processing apparatus to: configure the respective DSP augmentation networks as a multiple-input multiple-output (MIMO) filter.

Clause 13. The audio signal processing apparatus of any one of the foregoing clauses, wherein the instructions are further operable to cause the audio signal processing apparatus to: configure the respective neural network paths based on parameters of the respective DSP augmentation networks.

Clause 14. The audio signal processing apparatus of any one of the foregoing clauses, wherein the respective neural network paths are configured as an encoder/decoder network associated with machine learning.

Clause 15. The audio signal processing apparatus of any one of the foregoing clauses, wherein the respective neural network paths are configured as U-Net models.

Clause 16. The audio signal processing apparatus of any one of the foregoing clauses, wherein the instructions are further operable to cause the audio signal processing apparatus to: train the respective neural network paths of the hybrid neural network model process based on an audio feature training set associated with correlation features between the DSP augmentation networks and the respective neural network paths.

Clause 17. The audio signal processing apparatus of any one of the foregoing clauses, wherein the instructions are further operable to cause the audio signal processing apparatus to: train the respective neural network paths of the hybrid neural network model process based on an audio feature training set associated with features for noise reduction, noise cancellation, or dereverberation.

Clause 18. The audio signal processing apparatus of any one of the foregoing clauses, wherein the instructions are further operable to cause the audio signal processing apparatus to: train the respective neural network paths of the hybrid neural network model process based on an audio feature training set associated with features for augmenting band-limited beamforming microphone array audio.

Clause 19. The audio signal processing apparatus of any one of the foregoing clauses, wherein the respective augmented signal path data vectors are configured as respective filter mask data structures.

Clause 20. The audio signal processing apparatus of any one of the foregoing clauses, wherein the respective audio capture devices comprise a microphone array.

Clause 21. The audio signal processing apparatus of any one of the foregoing clauses, wherein the respective audio capture devices comprise respective directional microphones.

Clause 22. The audio signal processing apparatus of any one of the foregoing clauses, wherein the respective audio capture devices comprise a band-limited beamforming microphone array.

Clause 23. The audio signal processing apparatus of any one of the foregoing clauses, wherein the one or more non-audio capture areas correspond to an area of the audio environment where an audio capture device from the audio capture devices is not present or is not capable of capturing audio.

Clause 24. A computer-implemented method comprising steps in accordance with any one of the foregoing clauses.

Clause 25. A computer program product, stored on a computer readable medium, comprising instructions that, when executed by one or more processors of the audio signal processing apparatus, cause the one or more processors to perform one or more operations related to any one of the foregoing clauses.

Clause 26. An audio signal processing apparatus comprising at least one processor and a memory storing instructions that are operable, when executed by the processor, to cause the audio signal processing apparatus to: receive audio stream inputs associated with audio capture devices positioned within one or more audio capture areas of an audio environment.

Clause 27. The audio signal processing apparatus of clause 26, wherein the audio environment comprises the one or more audio capture areas and one or more non-audio capture areas.

Clause 28. The audio signal processing apparatus of any one of clauses 26-27, wherein the instructions are further operable to cause the audio signal processing apparatus to: transform the audio stream inputs associated with the audio capture devices into respective audio feature sets.

Clause 29. The audio signal processing apparatus of any one of the foregoing clauses, wherein the instructions are further operable to cause the audio signal processing apparatus to: provide the respective audio feature sets to a model configured to generate respective augmented signal path data vectors for the audio stream inputs.

Clause 30. The audio signal processing apparatus of any one of the foregoing clauses, where respective modeling paths of the model process one or more of the respective audio feature sets based on respective audio augmentation networks integrated within the model.

Clause 31. The audio signal processing apparatus of any one of the foregoing clauses, wherein the instructions are further operable to cause the audio signal processing apparatus to: apply the respective augmented signal path data vectors to the respective audio feature sets to generate audio immersion stream output related to the audio stream inputs.

Clause 32. The audio signal processing apparatus of any one of the foregoing clauses, wherein the audio immersion stream output provides audio output for both the one or more audio capture areas and the one or more non-audio capture areas of the audio environment.

Clause 33. The audio signal processing apparatus of any one of the foregoing clauses, wherein the instructions are further operable to cause the audio signal processing apparatus to: output the audio immersion stream output to an audio output device.

Clause 34. A computer-implemented method comprising steps in accordance with any one of the foregoing clauses.

Clause 35. A computer program product, stored on a computer readable medium, comprising instructions that, when executed by one or more processors of the audio signal processing apparatus, cause the one or more processors to perform one or more operations related to any one of the foregoing clauses.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An audio signal processing apparatus comprising at least one processor and a memory storing instructions that are operable, when executed by the at least one processor, to cause the audio signal processing apparatus to:

receive audio stream inputs associated with respective audio capture devices positioned within one or more audio capture areas of an audio environment, wherein the audio environment comprises the one or more audio capture areas and one or more non-audio capture areas;

transform the audio stream inputs associated with the respective audio capture devices into respective audio feature sets;

input the respective audio feature sets to a hybrid neural network model configured to generate respective augmented signal path data vectors for the audio stream inputs, wherein respective neural network paths of the hybrid neural network model process one or more of the respective audio feature sets based on respective digital signal processing (DSP) augmentation networks integrated within the hybrid neural network model;

apply the respective augmented signal path data vectors to the respective audio feature sets to generate audio immersion stream output related to the audio stream inputs, wherein the audio immersion stream output provides audio output for both the one or more audio capture areas and the one or more non-audio capture areas of the audio environment; and output the audio immersion stream output to an audio output device.

2. The audio signal processing apparatus of claim 1, wherein characteristics of the audio immersion stream output differ from the audio stream inputs associated with the respective audio capture devices arranged within the one or more audio capture areas of the audio environment.

3. The audio signal processing apparatus of claim 1, wherein the instructions are further operable to cause the audio signal processing apparatus to:

generate DSP feature predictions via the respective neural network paths based at least in part on non-linear characteristics associated with the audio stream inputs.

4. The audio signal processing apparatus of claim 1, wherein the instructions are further operable to cause the audio signal processing apparatus to:

generate DSP feature predictions via the respective neural network paths based at least in part on signal path characteristics associated with the audio stream inputs.

5. The audio signal processing apparatus of claim 1, wherein the instructions are further operable to cause the audio signal processing apparatus to:

configure the respective DSP augmentation networks as a multiple-input multiple-output (MIMO) filter.

6. The audio signal processing apparatus of claim 1, wherein the instructions are further operable to cause the audio signal processing apparatus to:

configure the respective neural network paths based on parameters of the respective DSP augmentation networks.

7. The audio signal processing apparatus of claim 1, wherein the respective neural network paths are configured as an encoder/decoder network associated with machine learning.

8. The audio signal processing apparatus of claim 1, wherein the respective neural network paths are configured as U-Net models.

9. The audio signal processing apparatus of claim 1, wherein the instructions are further operable to cause the audio signal processing apparatus to:

train the respective neural network paths of the hybrid neural network model process based on an audio feature training set associated with correlation features between the DSP augmentation networks and the respective neural network paths.

10. The audio signal processing apparatus of claim 1, wherein the instructions are further operable to cause the audio signal processing apparatus to:

train the respective neural network paths of the hybrid neural network model process based on an audio feature training set associated with features for noise reduction, noise cancellation, or dereverberation.

11. The audio signal processing apparatus of claim 1, wherein the instructions are further operable to cause the audio signal processing apparatus to:

train the respective neural network paths of the hybrid neural network model process based on an audio feature training set associated with features for augmenting band-limited beamforming microphone array audio.

12. The audio signal processing apparatus of claim 1, wherein the respective augmented signal path data vectors are configured as respective filter mask data structures.

13. The audio signal processing apparatus of claim 1, wherein the respective audio capture devices comprise a microphone array or respective directional microphones.

14. A computer-implemented method performed by an audio signal processing apparatus, comprising:

receiving audio stream inputs associated with respective audio capture devices positioned within one or more audio capture areas of an audio environment, wherein the audio environment comprises the one or more audio capture areas and one or more non-audio capture areas;

transforming the audio stream inputs associated with the respective audio capture devices into respective audio feature sets;

inputting the respective audio feature sets to a hybrid neural network model configured to generate respective augmented signal path data vectors for the audio stream inputs, wherein respective neural network paths of the hybrid neural network model process one or more of the respective audio feature sets based on respective digital signal processing (DSP) augmentation networks integrated within the hybrid neural network model;

applying the respective augmented signal path data vectors to the respective audio feature sets to generate audio immersion stream output related to the audio stream inputs, wherein the audio immersion stream output provides audio output for both the one or more audio capture areas and the one or more non-audio capture areas of the audio environment; and outputting the audio immersion stream output to an audio output device.

15. The computer-implemented method of claim 14, further comprising:

generating DSP feature predictions via the respective neural network paths based at least in part on non-linear characteristics associated with the audio stream inputs.

16. The computer-implemented method of claim 14, further comprising:

generating DSP feature predictions via the respective neural network paths based at least in part on signal path characteristics associated with the audio stream inputs.

17. The computer-implemented method of claim 14, further comprising:

configuring the respective DSP augmentation networks as a multiple-input multiple-output (MIMO) filter.

18. The computer-implemented method of claim 14, further comprising:

configuring the respective neural network paths based on parameters of the respective DSP augmentation networks.

19. The computer-implemented method of claim 14, further comprising:

training the respective neural network paths of the hybrid neural network model process based on an audio feature training set associated with correlation features between the DSP augmentation networks and the respective neural network paths.

20. A computer program product, stored on a non-transitory computer readable storage medium, comprising instructions that, when executed by one or more processors of an audio signal processing apparatus, cause the one or more processors to:

receive audio stream inputs associated with respective audio capture devices positioned within one or more audio capture areas of an audio environment, wherein the audio environment comprises the one or more audio capture areas and one or more non-audio capture areas;

transform the audio stream inputs associated with the respective audio capture devices into respective audio feature sets;

input the respective audio feature sets to a hybrid neural network model configured to generate respective augmented signal path data vectors for the audio stream inputs, wherein respective neural network paths of the hybrid neural network model process one or more of the respective audio feature sets based on respective digital signal processing (DSP) augmentation networks integrated within the hybrid neural network model;

apply the respective augmented signal path data vectors to the respective audio feature sets to generate audio immersion stream output related to the audio stream inputs, wherein the audio immersion stream output provides audio output for both the one or more audio capture areas and the one or more non-audio capture areas of the audio environment; and output the audio immersion stream output to an audio output device.

* * * * *